United States Patent
Acosta et al.

(10) Patent No.: US 12,359,116 B2
(45) Date of Patent: Jul. 15, 2025

(54) PARTICLES FOR CARRIERS AND TRACERS

(71) Applicant: Alchemy Sciences, Inc., Houston, TX (US)

(72) Inventors: Erick Acosta, Sugar Land, TX (US); Luchao Jin, Houston, TX (US); Shashidhar Rajagopalan, Fulshear, TX (US)

(73) Assignee: Alchemy Sciences, Inc., Houston, TX (US)

( * ) Notice: Subject to any disclaimer, the term of this patent is extended or adjusted under 35 U.S.C. 154(b) by 0 days.

(21) Appl. No.: 18/435,424

(22) Filed: Feb. 7, 2024

(65) Prior Publication Data

US 2024/0247184 A1    Jul. 25, 2024

Related U.S. Application Data

(62) Division of application No. 17/887,254, filed on Aug. 12, 2022, now Pat. No. 11,932,812.

(60) Provisional application No. 63/237,949, filed on Aug. 27, 2021.

(51) Int. Cl.
| | |
|---|---|
| C09K 8/92 | (2006.01) |
| C09K 8/84 | (2006.01) |
| C09K 8/88 | (2006.01) |
| E21B 49/00 | (2006.01) |
| G01V 3/26 | (2006.01) |

(52) U.S. Cl.
CPC ............... *C09K 8/92* (2013.01); *C09K 8/845* (2013.01); *C09K 8/882* (2013.01); *C09K 8/885* (2013.01); *E21B 49/00* (2013.01); *E21B 49/008* (2013.01); *G01V 3/26* (2013.01)

(58) Field of Classification Search
CPC ...... C09K 8/72; C09K 2208/32; C09K 8/524; C09K 8/528; C09K 8/54; C09K 8/725; C09K 8/845; C09K 8/882; C09K 8/885; C09K 8/92; E21B 43/27; E21B 49/00; E21B 37/00; E21B 43/26; E21B 43/267; E21B 47/11
See application file for complete search history.

(56) References Cited

U.S. PATENT DOCUMENTS 9,315,721 B2 *    4/2016    Mahoney ................. C09K 8/80

FOREIGN PATENT DOCUMENTS

CA          2770634 A1 *    2/2011 ............. C09K 8/516

* cited by examiner

Primary Examiner — Zakiya W Bates
(74) Attorney, Agent, or Firm — EWING & JONES, PLLC

(57) ABSTRACT

A process for forming a particle carrier system includes supplying a particle carrier, the particle carrier having a surface and modifying the particle carrier surface to include a first ionic functional group. The process also includes chemically binding the first ionic functional group on the particle carrier surface to a first ionic molecule.

7 Claims, No Drawings

PARTICLES FOR CARRIERS AND TRACERS

CROSS-REFERENCE TO RELATED APPLICATIONS

This application is a divisional application which claims priority from U.S. utility application Ser. No. 17/887,254, filed Aug. 12, 2022, which is itself a nonprovisional application which claims priority from U.S. provisional application No. 63/237,949, filed Aug. 27, 2021, each of which is incorporated by reference herein in its entirety.

BACKGROUND

Field

The disclosure relates generally to the fields of particle carrier systems and tracer systems in subterranean formations.

Background Art

Surfactants and other chemicals and materials are in wide use as agents in improved oil recovery (IOR) operations. These operations can include well-stimulation such as hydraulic fracturing and matrix acidizing, secondary recovery, and tertiary recovery. Hydrocarbon recovery via the use of injected chemicals and materials is a multivariate and complex function of several factors, among them are interfacial tension (IFT) reduction, wettability alteration, emulsion tendency, and compatibility with other fluid additives (e.g. friction reducers). Furthermore, surfactants and other chemicals and materials are also used to increase carbon dioxide injection efficiency and containment in subterranean formations.

Tracers are traditionally used in the oil industry in order to qualitatively or quantitatively gauge how fluid flows through the reservoir and for estimating residual oil saturation, to qualitatively or quantitatively allocate production from various sections of the reservoir in contact with the wellbore, and to estimate treatment efficacy. Tracers may be used in either interwell tests or single well tests.

SUMMARY

A process for forming a particle carrier system is disclosed. The process includes supplying a particle carrier, the particle carrier having a surface and modifying the particle carrier surface to include a first ionic functional group. The process also includes chemically binding the first ionic functional group on the particle carrier surface to a first ionic molecule.

A process for delivery of a first ionic molecule into a subterranean formation is disclosed. The process includes supplying a particle carrier system, the particle carrier system including a particle carrier. The particle carrier is nano- or micro-sized and has a surface, the surface including a first ionic functional group, the first ionic functional group chemically bound to the first ionic molecule. The process also includes injecting the particle carrier system into the subterranean formation and altering the pKa in the subterranean formation to a first release pKa to release the chemical bond between the first ionic functional group and the first ionic molecule.

A method is disclosed. The method includes supplying a coated particle carrier, the coated particle carrier having a coating and chemically altering the coating to include a halogenated salt, a halogenated acid, a halogenated hydrocarbon, or a perfluorocarbon to form an altered particle carrier coating. The method also includes introducing the altered coated particle carrier with the altered particle carrier coating into a subterranean fluid, the subterranean fluid having a water phase, an oil phase and a gas phase. The method also includes dissolving the altered particle carrier coating and measuring the halogenated salt, the halogenated acid, the halogenated hydrocarbon, or the perfluorocarbon in a production fluid using gas or liquid phase chromatography.

A process is disclosed. The process includes supplying a coated particle carrier, the coated particle carrier having a coating. The process also includes impregnating the coating to include a ferromagnetic material to form an altered particle carrier and introducing the altered coated particle carrier into a subterranean formation. The process also includes energizing a surface or subsurface and measuring secondary electric or magnetic fields formed by measuring the surface or subsurface. In addition, the method includes locating the special distribution of the altered particle carrier.

DETAILED DESCRIPTION

The following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

This disclosure is not limited to the embodiments, versions, or examples described, which are included to enable a person having ordinary skill in the art to make and use the disclosed subject matter when the information contained herein is combined with existing information and technology.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations. For example, if the detailed description recites a range of from 1 to 5, that range includes all iterative ranges within that range including, for instance, 1.3-2.7 or 4.9-4.95.

Certain embodiments of the present disclosure are directed to particle carrier systems for delivery of ionic molecules into subterranean formations. Ionic molecules include, but are not limited to, anionic or cationic surfactants. The ionic molecules may alter wettability and increase oil production.

The particle carrier systems may include a particle carrier. The particle carrier may include a pH-triggered mechanism described herein below. In some embodiments, a coating may be applied to the particle carrier to function as a secondary release mechanism. Examples of secondary release mechanisms may be temperature, shear, and pressure.

The particle carrier in the particle carrier system may be nano- or micro-sized, for example, between 1 and 100 nm for nanoparticles and between 100 and 2500 nm for micro-sized particles. The surface of the particle may be smooth, porous, or meso-porous. Particle carriers may exhibit different degrees of roughness and sphericity. For particle carriers that are porous or non-porous, the surface of the particle carriers may be modified to include functional groups that create ionic bonds with the ionic molecules on the surface of the particle carriers. Functionalization of the particles may be accomplished by reacting functionalized silanes with particle surface to covalently bond the silanes and expose the functional groups.

Examples of functional groups on the surface of the modified particle carriers may include anionic functional groups such as carboxylate, sulfate, sulfonate, phosphate, and phenolic functional groups. Examples of cationic functional groups may include ammonium and phosphonium functional groups. Thus, at a certain pH range, an anionic functional group on the surface of the particle carrier may bind to a cationic molecule, such as, for example, a cationic surfactant. Similarly, at a certain pH range, a cationic functional group on the surface of the particle carrier may bond to an anionic molecule, such as, for example, an anionic surfactant.

The release pKa, that is, the pKa at which the ionic functional group on the surface of the particle carrier may be determined by the selection of the ionic functional group based on the acidity or basicity of the ionic functional group. In effect, by selecting different active moieties as ionic functional groups on the surface of the particle carrier, the release pKa for a particle carrier may be "tuned" for a specific subterranean formation conditions. For example, the release pKa acetic acid is pKa 4.7; Phosphoric acid pKa 2.1; Sulfuric acid pKa −3; and p-toluene sulfonic acid pKa −7. In certain embodiments, particle carriers with different surface ionic functional groups may be mixed, allowing different release pKas to release different bound molecules.

Mesoporous carrier particles, a class of nanoporous materials with pores sizes between 2 and 50 nm that may include active centers or host-guest for different kinds of molecules. The surface and pores of the mesoporous carrier particles may create a larger surface area than that of non-porous or porous carrier particles. Both the surface and the pores of the mesoporous particle carrier may be modified to include functional groups, as described above. The ionic groups on the surface of the mesoporous particle carrier may be the same or different. When the ionic groups on the surface of the mesoporous particle are different, the release pKa may be different, allowing an operator to control a rate of release of the bound molecules or release different bound molecules at different pKas.

In certain embodiments, the particle carrier may be encapsulated by a particle coating. In certain embodiments, the particle coating may be a paraffin wax coating. At the melt temperature of the paraffin wax, the paraffin wax coating may melt, exposing the particle carrier along with the bound molecule to the subterranean formation fluids. In other embodiments, the particle coating may be a polymer such as polystyrene, polybutylene, polyvinyl alcohol, polyurethane, polyester, polyamide, polyethylene, polycarbonate, polypropylene, polyvinyl chloride, polyisoprene, polyisobutylene, butadiene/styrene copolymers, polytetrafluoroethylene, polyglycol (for example, polyethylene glycol), polylactic acid, a polyacrylate, or polyacrylamide. The polymer particle coating may be sheared, such as during a fracturing operation, thereby exposing the particle carrier along with the bound molecule to the subterranean formation fluids. In yet other embodiments, the particle coating may be a mineral coating such as those made from carbonates and silicates. When the pressure of the fluid in the subterranean fluid reaches a break pressure, or the subterranean fluid is acidified, the mineral coating may be broken or dissolved, thereby exposing the particle carrier along with the bound molecule to the subterranean formation fluids.

By using the particle coating, the particle carrier system may include a two-step release mechanism. The first step of the release mechanism is to expose the particle carrier in conjunction with the bound molecule to the subterranean formation fluids by reaching a pre-defined temperature, pressure, or shear on the particle carrier system, thereby removing the particle coating. The second step of the release mechanism is to alter the pH of the subterranean formation fluid to release the bound molecule.

In use, for example in an IOR (improved oil recovery) operation, the particle carrier system is pumped or otherwise transferred to the fluids in the subterranean formation. When the particle carrier system includes a particle coating, the particle coating may be removed by the first step in the release mechanism, for example, increasing the temperature of the fluid by heat transfer from the reservoir, shearing the fluid, or increasing the pressure. When the particle carrier system does not include a particle coating or after the particle coating has been removed, the pH of the fluid in the subterranean fluid may be altered to release the bound molecule. The then-unbound molecule may then reduce interfacial tension or alter wettability to preferentially produce target fluids, such as crude oil, from the subterrain formation, or trap target fluids, such as water and carbon dioxide, in the subterrain formation, respectively.

In yet other embodiments, particle carriers, such as those described above, may be used as tracers to allow for downhole or surface detection capabilities. In some such embodiments, tracers may be active in a well by 60 days, 90 days, or more. In certain of these embodiments, the particle carrier may be used to tag a production fluid by chemically altering the particle coating so that the impregnated tracer materials may be detected during such operations as flow-back and fluid production. For example, by chemically altering the particle coating to include a halogenated salt or a halogenated acid such as fluorobenzoic acid, the released tracer will travel with the water phase of the production fluid. By chemically altering the particle coating with a halogenated hydrocarbon, such as bromo-fluorobenzene, the released tracer will travel with the oil phase of the production fluid. Similarly, by chemically altering the particle coating with a perfluorocarbon, the released tracer may travel with the gas phase of the production fluid. The tracer may be released, for example and without limitation, by dissolution of the particle coating. By measuring the production fluid using such test methods as gas or liquid chromatography, both quantitative and qualitative determinations may be made of the liquid, oil, and gas phases of the production fluid may be made.

In another process using particle carriers, the particle carrier may include a ferromagnetic material in a particle coating, where the particle coating may be impregnated with the ferromagnetic material during manufacture. The ferromagnetic-coated particle carriers may then be pumped or otherwise introduced into the fluids in the subterranean formation. Once in the subterranean formation, the ferromagnetic coated particle carriers possess electromagnetic characteristics sufficiently different from the surrounding subterranean formation to create an electromagnetic contrast capable of detection. During energization at surface or subsurface, electric and/or magnetic responses may be detected and recorded by receivers placed on the surface. These electric and/or magnetic response fields interact with the subterranean formation containing the coated particles with impregnated ferro-magnetic materials and produce detectable secondary electric and magnetic fields, which can then be measured to locate the spatial distribution of coated particles with impregnated ferro-magnetic materials and estimate the effective treatment area and volume of the reservoir.

The particle carriers may be introduced at selected times within the injection schedule of an IOR operation, such as a hydraulic fracturing operation. For example, the particle carriers may be injected at the beginning, end, or at other points in the hydraulic fracturing fluid injection schedule. Different particle carriers may be introduced at different times and in different concentrations.

The particle carriers and particle carrier systems disclosed herein may be used in processes such as hydraulic fracturing, matrix acidizing, and secondary and tertiary flooding. The particle carriers and particle carrier systems may be used in aqueous phases, oil phases, and gas phases. The particle carriers and particle carrier systems may be used throughout a single well cyclic injection, soak and production process. The particle carriers and particle carrier systems disclosed herein may also be used in carbon dioxide injection and storage.

The invention claimed is:

1. A process for forming a particle carrier system comprising: supplying a particle carrier, the particle carrier having a surface, wherein the particle carrier is mesoporous, the particle carrier having pore sizes between 2 and 50 nm; modifying the particle carrier surface to include a first ionic functional group; modifying the pores of the particle carrier to include a second ionic functional group; chemically binding the first ionic functional group on the particle carrier surface to a first ionic molecule; and binding a second ionic molecule to the pores of the particle carrier.

2. The process of claim 1, wherein the first ionic functional group and the second ionic function group are different.

3. The process of claim 1, wherein the first ionic functional group is a carboxylate, sulfate, phosphate, phenolic, ammonium, or phosphonium functional group.

4. The process of claim 1 wherein the particle carrier is encapsulated by a particle coating.

5. The process of claim 4, wherein the particle coating is a paraffin wax, a polymer, or a mineral coating.

6. The process of claim 5, wherein the particle coating is a polymer, wherein the polymer is a polystyrene, polybutylene, polyvinyl alcohol, polyurethane, polyester, polyamide, polyethylene, polycarbonate, polypropylene, polyvinyl chloride, polyisoprene, polyisobutylene, butadiene/styrene copolymers, polytetrafluoroethylene, polyglycol, polylactic acid, a polyacrylate, or polyacrylamide.

7. The process of claim 5, wherein the particle coating is a mineral, wherein the mineral is a carbonate or silicate.

* * * * *